Patented May 16, 1933

1,909,240

UNITED STATES PATENT OFFICE

ADRIANUS JOHANNES VAN PESKI, OF AMSTERDAM, NETHERLANDS, ASSIGNOR TO NAAMLOOZE VENNOOTSCHAP DE BATAAFSCHE PETROLEUM MAATSCHAPPIJ, OF THE HAGUE, NETHERLANDS

PROCESS FOR THE PREPARATION OF CONCENTRATED FORMIC ACID SOLUTIONS

No Drawing. Application filed October 16, 1929, Serial No. 400,166, and in the Netherlands October 31, 1928.

A known method for obtaining a well-concentrated formic acid from its watery solution consists in dissolving waterfree oxalic acid in the liquid containing formic acid and subsequently allowing it to crystallize out. The oxalic acid crystals are separated from the liquid, after which the formic acid is distilled.

A drawback of the process is that one gets water-containing crystallized oxalic acid, which cannot be used again directly as a dehydrating agent, whilst losses are always incurred in the separation of the crystals, the latter morevoer constituting an extra treatment, which need not take place in the process according to the present invention.

In practice, the freezing out of the formic acid is possible only with already fairly well concentrated solutions which even then gives an unsatisfactory yield.

When trying to distill off formic acid with sulphuric acid, the yields appear to be very unsatisfatory, which is chiefly due to losses caused by decomposition of a part of the formic acid.

The process according to the invention does not possess these drawbacks and forms in every respect a techincally very useful method which contingently may also serve for concentrating other aqueous solutions depending on the nature of the substance to be concentrated.

The invention consists in that the formic acid solution to be concentrated is distilled, preferably under vacuum, with concentrated ortho- or meta- or pyrophosphoric acid or mixtures of these acids.

Example 400 grams 85% formic acid were distilled at a pressure of 12 mm. with 400 grams phosphoric acid (spec. grav. 1.7) previously distilled off at a pressure of 12 mm. to 150° C.

Up to 30° C. the yield was 173 gr. 97.5% formic acid, from 30–40° C. the yield was 90 gr. 94.8% formic acid, from 40–50° C. the yield was 51 gr. 85.7% formic acid, from 50–60° C. the yield was 24 gr. 73.7% formic acid, from 60–80° C. the yield was 19 gr. 56.8% formic acid and from 80–120° C. the yield was 14 gr. 26% formic acid.

These fractions can be separately collected if desired.

Finally a concentrated phosphoric acid solution remains, which is ready to be used again. It appeared that the yield of concentrated formic acid could be increased by the use of more phosphoric acid and by applying fractional distillation.

The phosphoric acids do not have any substantial chemical action on the formic acid, but have a strong water-holding property, so that the water content of the initial formic acid can largely be held back while a large part of the formic acid can be distilled without any large amount of the same being decomposed.

What I claim is:—

1. A process of concentrating formic acid containing water which comprises mixing a concentrated phosphoric acid with such formic acid containing water and distilling a plurality of fractions of formic acid from said mixture, the first fraction at least being of a higher concentration than the formic acid initially used in said process, thereby leaving phosphoric acid suitable for reuse in the process.

2. A process of concentrating formic acid containing water which comprises mixing such aqueous formic acid with a concentrated phosphoric acid and distilling from said mixture, formic acid containing a substantially lower percentage of water than does the formic acid originally used, such distillation being conducted under a pressure substantially below atmospheric.

3. Process of preparing concentrated formic acid solutions consisting in adding at least one phosphoric acid in a concentrated condition to the formic acid solution to be concentrated, subjecting the mixture to distillation and condensing the vapors.

4. Process for preparing concentrated formic acid solutions consisting in adding at least one phosphoric acid in a concentrated condition to the formic acid solution to be concentrated, subjecting the mixture to distillation under vacuum and condensing the vapors.

In testimony whereof I have affixed my signature.

ADRIANUS JOHANNES van PESKI.